US010931853B2

(12) United States Patent
Zhu et al.

(10) Patent No.: US 10,931,853 B2
(45) Date of Patent: Feb. 23, 2021

(54) ENHANCED COLOR REPRODUCTION FOR UPSCALING

(71) Applicants: Sony Corporation, Tokyo (JP); Sony Pictures Entertainment Inc., Culver City, CA (US)

(72) Inventors: Miaoqi Zhu, Studio City, CA (US); Yoshikazu Takashima, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 52 days.

(21) Appl. No.: 16/440,828

(22) Filed: Jun. 13, 2019

(65) Prior Publication Data

US 2020/0128151 A1    Apr. 23, 2020

Related U.S. Application Data

(60) Provisional application No. 62/747,453, filed on Oct. 18, 2018.

(51) Int. Cl.
*G06K 9/00* (2006.01)
*H04N 1/60* (2006.01)
(Continued)

(52) U.S. Cl.
CPC ......... *H04N 1/6027* (2013.01); *G06K 9/4652* (2013.01); *G06K 9/6256* (2013.01);
(Continued)

(58) Field of Classification Search
CPC .... G06K 9/4652; G06K 9/6256; G06N 20/00; G06N 3/02; G06T 2207/10024;
(Continued)

(56) References Cited

U.S. PATENT DOCUMENTS 5,237,624 A     8/1993  Okamoto
9,336,582 B1 *  5/2016  Barron ..................... G06T 5/40
(Continued)

FOREIGN PATENT DOCUMENTS

CN      106204447 A     12/2016
CN      106910161 A     6/2017
(Continued)

OTHER PUBLICATIONS

Xu, Jinchang, et al. "Fast and accurate image super-resolution using a combined loss." Proceedings of the IEEE Conference on Computer Vision and Pattern Recognition Workshops. 2017. (Year: 2017).*

(Continued)

*Primary Examiner* — Li Liu
(74) *Attorney, Agent, or Firm* — Procopio, Cory, Hargreaves & Savitch LLP

(57) ABSTRACT

A method for enhancing color reproduction in an upscaling process, including: converting RGB-formatted data to color-space-separable-formatted data; sending the RGB-formatted data to a neural network for training to generate RGB-predicted data; converting the RGB-predicted data to color-space-separable-predicted data; computing a first loss function by calculating a first difference between the RGB-formatted data and the RGB-predicted data; extracting color-formatted data from the color-space-separable-formatted data; extracting color-predicted data from the color-space-separable-predicted data; computing a second loss function by calculating a second difference between the color-formatted data and the color-predicted data; and adjusting a balance between the first and second loss functions.

20 Claims, 4 Drawing Sheets

(51) Int. Cl.
| | |
|---|---|
| *G06K 9/46* | (2006.01) |
| *G06T 3/40* | (2006.01) |
| *G06N 3/02* | (2006.01) |
| *G06T 7/11* | (2017.01) |
| *G06N 20/00* | (2019.01) |
| *G06K 9/62* | (2006.01) |
| *G06T 9/00* | (2006.01) |
| *G06T 7/13* | (2017.01) |
| *G06T 5/00* | (2006.01) |
| *G06T 5/10* | (2006.01) |

(52) U.S. Cl.
CPC .............. *G06N 3/02* (2013.01); *G06N 20/00* (2019.01); *G06T 3/4046* (2013.01); *G06T 3/4053* (2013.01); *G06T 3/4076* (2013.01); *G06T 5/003* (2013.01); *G06T 5/10* (2013.01); *G06T 7/11* (2017.01); *G06T 7/13* (2017.01); *G06T 9/002* (2013.01); *G06T 2207/10024* (2013.01); *G06T 2207/20021* (2013.01); *G06T 2207/20081* (2013.01); *G06T 2207/20084* (2013.01)

(58) Field of Classification Search
CPC . G06T 2207/20081; G06T 2207/20084; G06T 3/4046; G06T 3/4053; G06T 9/002; H04N 1/6027
See application file for complete search history.

(56) References Cited

U.S. PATENT DOCUMENTS

| | | | |
|---|---|---|---|
| 9,836,819 | B1 | 12/2017 | Donsbach et al. |
| 9,865,037 | B2 | 1/2018 | Salvador Marcos |
| 10,032,256 | B1 | 7/2018 | Anaya |
| 10,091,479 | B2 | 10/2018 | Barron et al. |
| 2004/0218834 | A1 | 11/2004 | Bishop |
| 2008/0140594 | A1 | 6/2008 | Tannhof et al. |
| 2014/0267283 | A1 | 9/2014 | Nystad et al. |
| 2015/0117762 | A1 | 4/2015 | Shibata |
| 2017/0132759 | A1 | 5/2017 | Perez |
| 2017/0256033 | A1 | 9/2017 | Tuzel |
| 2019/0045168 | A1* | 2/2019 | Chaudhuri ......... H04N 5/23232 |
| 2020/0051211 | A1 | 2/2020 | Shiokawa |
| 2020/0126183 | A1 | 4/2020 | Zhu |

FOREIGN PATENT DOCUMENTS

| | | |
|---|---|---|
| CN | 107633229 A | 1/2018 |
| JP | 6349703 B | 7/2018 |
| KR | 101861342 B1 | 5/2018 |

OTHER PUBLICATIONS

Dong et al., "Image Super-Resolution Using Deep Convolutional Networks", IEEE, arXiv:1501.00092v3 [cs.CV] Jul. 31, 2015; pp. 1-14.

Shcherbinin et al., "Sharpening Image Details Using Local Phase Congruency Analysis", Society for Imaging Science and Technology, https://doi.org/10.2352/ISSN.2470-1173.2018.13.IPAS-218; pp. 218-1-218-5.

International Search Report and Written Opinion in related PCT Application No. PCT/US2019/056673, dated Jan. 16, 2020, 7 pages.

* cited by examiner

ENHANCED COLOR REPRODUCTION FOR UPSCALING

CROSS-REFERENCE TO RELATED APPLICATIONS

This application claims the benefit of priority under 35 U.S.C. § 119(e) of U.S. Provisional Patent Application No. 62/747,453, filed Oct. 18, 2018, entitled "Machine-Learning Based Single Image Upscaling Application for Motion Pictures." The disclosure of the above-referenced application is incorporated herein by reference.

BACKGROUND

Field

The present disclosure relates to image super-resolution upscaling, and more specifically, to enhanced color reproduction for the upscaling.

Background

Machine Learning (ML) can be used to perform image super-resolution upscaling. However, the conventional ML-based upscaling process has some observed issues including color shifts and loss of clear color separation among pixels when an RGB image format input is used without a deep neural network architecture.

SUMMARY

The present disclosure provides for enhanced color reproduction in an image super-resolution upscaling process.

In one implementation, a method for enhancing color reproduction in an upscaling process is disclosed. The method includes: converting RGB-formatted data to color-space-separable-formatted data; sending the RGB-formatted data to a neural network for training to generate RGB-predicted data; converting the RGB-predicted data to color-space-separable-predicted data; computing a first loss function by calculating a first difference between the RGB-formatted data and the RGB-predicted data; extracting color-formatted data from the color-space-separable-formatted data; extracting color-predicted data from the color-space-separable-predicted data; computing a second loss function by calculating a second difference between the color-formatted data and the color-predicted data; and adjusting a balance between the first and second loss functions.

In one implementation, the RGB-formatted data is an RGB-formatted image and the color-space-separable-formatted data is a color-space-separable-formatted image. In one implementation, the color-space-separable-formatted data includes YCbCr-formatted data. In one implementation, extracting color-predicted data from the color-space-separable-predicted data includes extracting color channels of the YCbCr-formatted data. In one implementation, the color channels include CbCr channels of the YCbCr-formatted data. In one implementation, the color-space-separable-formatted data includes Lab-formatted data. In one implementation, adjusting the balance between the first and second loss functions includes adjusting the weights for the first and second loss functions until the balance is found.

In another implementation, an enhanced color reproduction system is disclosed. The system includes: an RGB-to-color-space-separable converter configured to convert RGB-formatted data to color-space-separable-formatted data and to convert RGB-predicted data to color-space-separable-predicted data; a color extractor configured to extract color-formatted data from the color-space-separable-formatted data and to extract color-predicted data from the color-space-separable-predicted data; a loss function calculator configured to compute a first loss function by calculating a first difference between the RGB-formatted data and the RGB-predicted data and to compute a second loss function by calculating a second difference between the color-formatted data and the color-predicted data; and an adjustor configured to control an amount of the first loss function and an amount of the second loss function applied to a system output.

In one implementation, the color-space-separable-formatted data includes YCbCr-formatted data and the color-space-separable-predicted data includes YCbCr-predicted data. In one implementation, the color extractor is configured to extract color channels of the YCbCr-formatted data and the YCbCr-predicted data. In one implementation, the color channels include CbCr channels of the YCbCr-formatted data and the YCbCr-predicted data. In one implementation, the adjuster includes: a first multiplier configured to receive the first loss function and produce a first output; and a second multiplier configured to receive the second loss function and produce a second output. In one implementation, the adjuster further includes a weight adjuster configured to generate a first weight to be applied to the first multiplier and to generate a second weight to be applied to the second multiplier. In one implementation, the adjuster further includes an adder configured to add the first output and the second output to produce the system output, wherein the first output is the result of multiplying the first loss function by the first weight and the second output is the result of multiplying the second loss function by the second weight. In one implementation, the adjuster further includes a feedback unit configured to receive the system output and to provide a feedback to the weight adjuster to find a balance between an overall image quality and a color reproduction.

In yet another implementation, an enhanced color reproduction system receiving RGB-formatted data is disclosed. The system includes: a first converter configured to convert the RGB-formatted data to color-space-separable-formatted data, the first converter also configured to send the RGB-formatted data to a neural network, which generates RGB-predicted data; a first extractor configured to extract color-formatted data from the color-space-separable-formatted data; a second converter configured to convert the RGB-predicted data to color-space-separable-predicted data; a second extractor configured to extract color-predicted data from the color-space-separable-predicted data; a first loss function calculator configured to compute a first loss function by calculating a difference between the RGB-formatted data and the RGB-predicted data; a second loss function calculator configured to compute a second loss function by calculating a difference between the color-formatted data and the color-predicted data; and an adjuster configured to control a system output by adjusting a balance between the first loss function and the second loss function.

In one implementation, the color-space-separable-formatted data includes YCbCr-formatted data and the color-space-separable-predicted data includes YCbCr-predicted data. In one implementation, the color extractor is configured to extract color channels of the YCbCr-formatted data and the YCbCr-predicted data. In one implementation, the color channels include CbCr channels of the YCbCr-formatted data and the YCbCr-predicted data. In one implementation, the balance is determined by using some objective criteria between an overall image quality and a color reproduction.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the conventional ML-based upscaling process has some observed issues. For example, since luminance is prioritized over color, only a single channel (e.g., only the Y luminance channel from the YCbCr image is converted from the RGB image) is often used. Moreover, when the RGB image format input (i.e., 3 channel input) is used without a deep neural network architecture, the upscaling process sometimes exhibits color-shifting and color-contamination. In particular, the color shift causes different impressions in the human skin tone (e.g. face skin tone looks too green or too red). Further, objects with colorful details lose clear color separation among pixels (e.g. objects with the red and blue fine pattern become purple objects after upscaling).

Accordingly, to address the above-stated issues with the conventional process, certain implementations of the present disclosure provide for having an additional input to the ML-based training process in addition to the RGB input.

In one implementation, the additional input is generated by converting the RGB-formatted data to a format (e.g. YCbCr, Lab) which can be separated into the luminance channel and the color channel ("color space separable") and using only the color components (e.g. Cb/Cr channel in case of YCbCr) as the input to the training process. In this implementation, the additional input can be used during the optimization stage with the loss functions. Further, the weights for the RGB-based loss function and the color-component-only-based (e.g. CbCr) loss function are controlled to balance the priority between the overall image quality and the color reproduction.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 1:
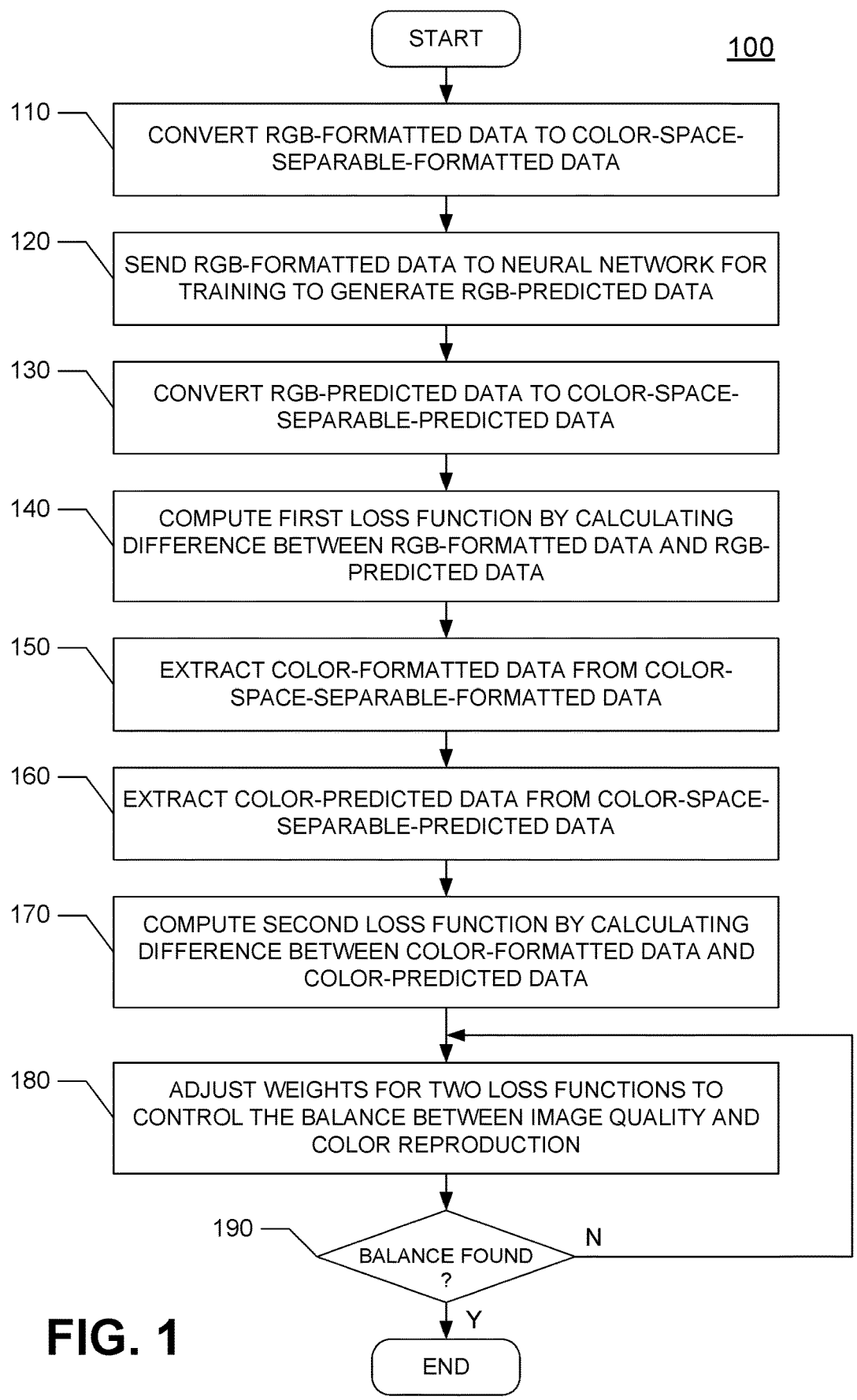
FIG. 1 is a flow diagram illustrating a process for enhancing color reproduction in an upscaling process in accordance with one implementation of the present disclosure.

FIG. 1 is a flow diagram illustrating a process 100 for enhancing color reproduction in an upscaling process in accordance with one implementation of the present disclosure. Although the steps of the upscaling process 100 in FIG. 1 are laid out in a particular order, the steps can be performed in any order without affecting the outcome of the process 100.

In the illustrated implementation of FIG. 1, the RGB-formatted data is converted, at block 110, to color-space-separable-formatted data. In one implementation, term "data" refers to an image. For example, the RGB-formatted data may refer to the RGB-formatted image and the color-space-separable-formatted data may refer to the color-space-separable-formatted image. In one implementation, the color-space-separable-formatted data includes YCbCr-formatted data. In another implementation, the color-space-separable-formatted data includes Lab-formatted data. The RGB-formatted data is sent to a neural network for training to generate RGB-predicted data, at block 120. The RGB-predicted data is then converted, at block 130, to color-space-separable-predicted data.

In the illustrated implementation of FIG. 1, the first loss function is computed, at block 140, by calculating the difference between the RGB-formatted data and the RGB-predicted data. At block 150, color-formatted data is extracted from the color-space-separable-formatted data. In one implementation, the color-space-separable-formatted data includes the YCbCr-formatted data and the color-formatted data is formed by using the color channels (i.e., CbCr channels) of the YCbCr-formatted data. At block 160, color-predicted data is extracted from the color-space-separable-predicted data generated in block 130. In one implementation, the color-space-separable-predicted data includes the YCbCr-predicted data and the color-predicted data is formed by using the color channels (i.e., CbCr channels) of the YCbCr-predicted data. At block 170, the second loss function is computed by calculating the difference between the color-formatted data and the color-predicted data.

In the illustrated implementation of FIG. 1, the color reproduction output is adjusted, at block 180, by adjusting the balance between the two loss functions. In one implementation, the adjustment is made by adjusting the weights for the two loss functions until the balance is found, at block 190.

Figure 2:
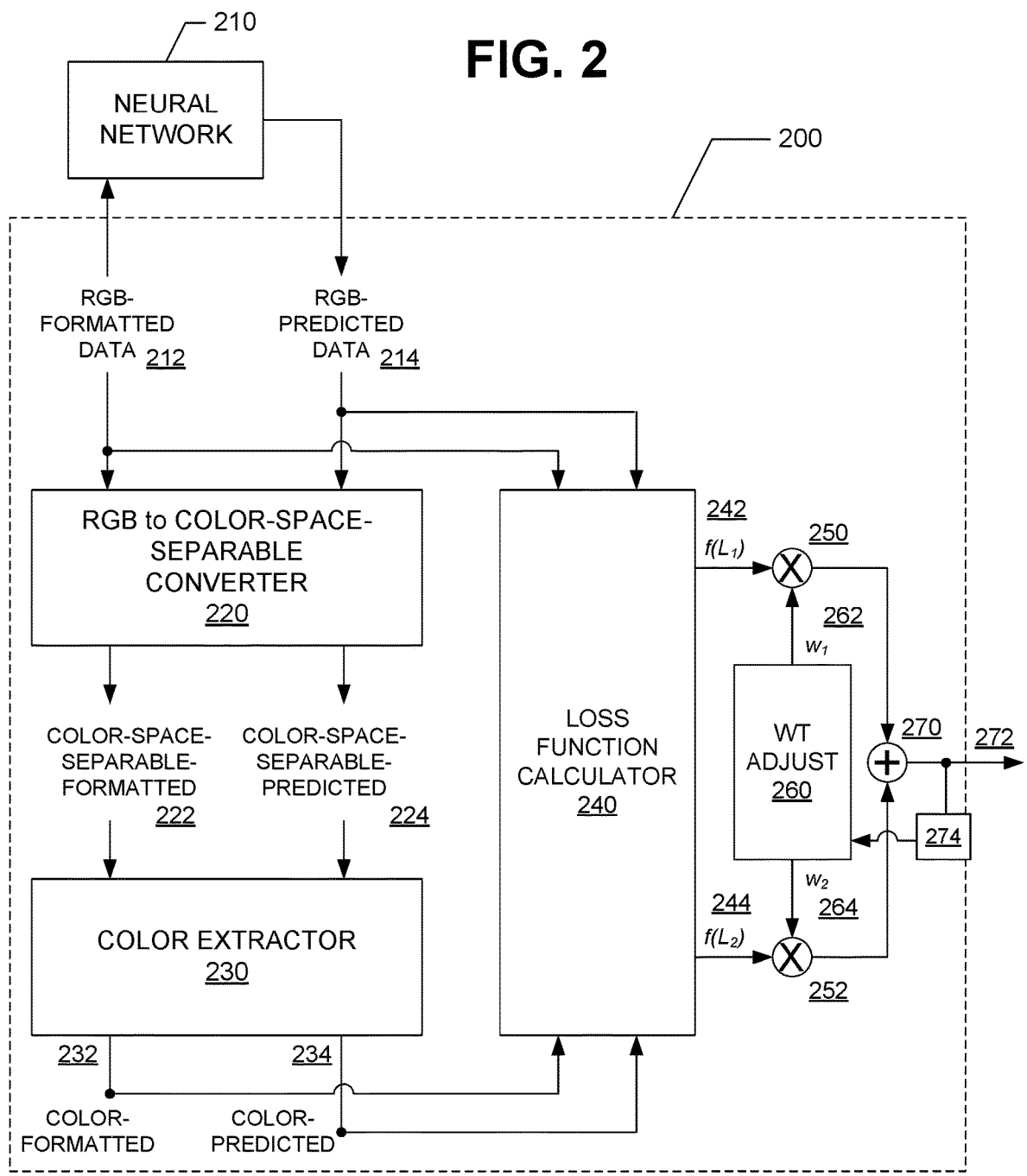
FIG. 2 is a block diagram showing an enhanced color reproduction system in accordance with one implementation of the present disclosure.

FIG. 2 is a block diagram showing an enhanced color reproduction system 200 in accordance with one implementation of the present disclosure. In the illustrated implementation of FIG. 2, the enhanced color reproduction system 200 includes an RGB-to-color-space-separable converter 220, a color extractor 230, a loss function calculator 240, a plurality of multipliers 250, 252, a weight adjustor 260, and an adder 270.

In one implementation, the RGB-to-color-space-separable converter 220 is configured to convert the RGB-formatted data 212 to color-space-separable-formatted data 222. In one implementation, the color-space-separable-formatted data 222 includes YCbCr-formatted data. In another implementation, the color-space-separable-formatted data includes Lab-formatted data. The RGB-formatted data 212 is sent to a neural network 210 for training to generate RGB-predicted data 214. The RGB-to-color-space-separable converter 220 also converts the RGB-predicted data 214 to color-space-separable-predicted data 224.

In one implementation, the color extractor 230 is configured to receive the color-space-separable-formatted data 222 and extract color-formatted data 232. In one implementation, the color-space-separable-formatted data 222 includes the YCbCr-formatted data and the color-formatted data 232 is formed by extracting the color channels (i.e., CbCr channels) of the YCbCr-formatted data. The color extractor 230 is also configured to receive the color-space-separable-predicted data 224 and extract color-predicted data 234. In one implementation, the color-space-separable-predicted data 224 includes the YCbCr-predicted data and the color-predicted data 234 is formed by extracting the color channels (i.e., CbCr channels) of the YCbCr-predicted data.

In one implementation, the loss function calculator 240 is configured to compute a first loss function ($f(L_1)$) 242 by calculating the difference between the RGB-formatted data 212 and the RGB-predicted data 214. The loss function calculator 240 is also configured to compute a second loss function ($f(L_2)$) 244 by calculating the difference between the color-formatted data 232 and the color-predicted data 234.

In one implementation, the weight adjuster 260 is configured to adjust or control the amount of loss functions that is applied to the output. For example, the amount of the first loss function (e.g., the RGB loss function) applied to the output is controlled by adjusting a first weight ($w_1$) 262 to be multiplied with the first loss function 242 by the multiplier 250, while the amount of the second loss function (e.g., the color-space-separable loss function) applied to the output is controlled by adjusting a second weight ($w_2$) 264 to be multiplied with the second loss function 244 by the multiplier 252. The adder 270 sums the outputs of the multipliers 250, 252 to produce the output 272 of the enhanced color reproduction system 200. The weight adjuster 260 is configured to keep adjusting the weights for the two loss functions using the feedback 274 until a balance is found. In one implementation, the balance is achieved when an observer subjectively determines that the balance has been reached. In another implementation, the balance is determined by some objective criteria that the balance between the overall image quality and the color reproduction has been reached. In the illustrated implementation of FIG. 2, the multipliers 250, 252, the weight adjuster 260, the adder 270, and the feedback 274 can be collectively referred to an adjuster.

In one implementation, the enhanced color reproduction system 200 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the enhanced color reproduction system 200 is configured with a combination of hardware and software. For example, the RGB-to-color-space-separable converter 220, the color extractor 230, and the loss function calculator 240 are configured with hardware, while the functions of the plurality of multipliers 250, 252, the weight adjustor 260, the adder 270, and the feedback 274 are configured as software residing within the loss function calculator 240 or a separate processor.

Figure 3:
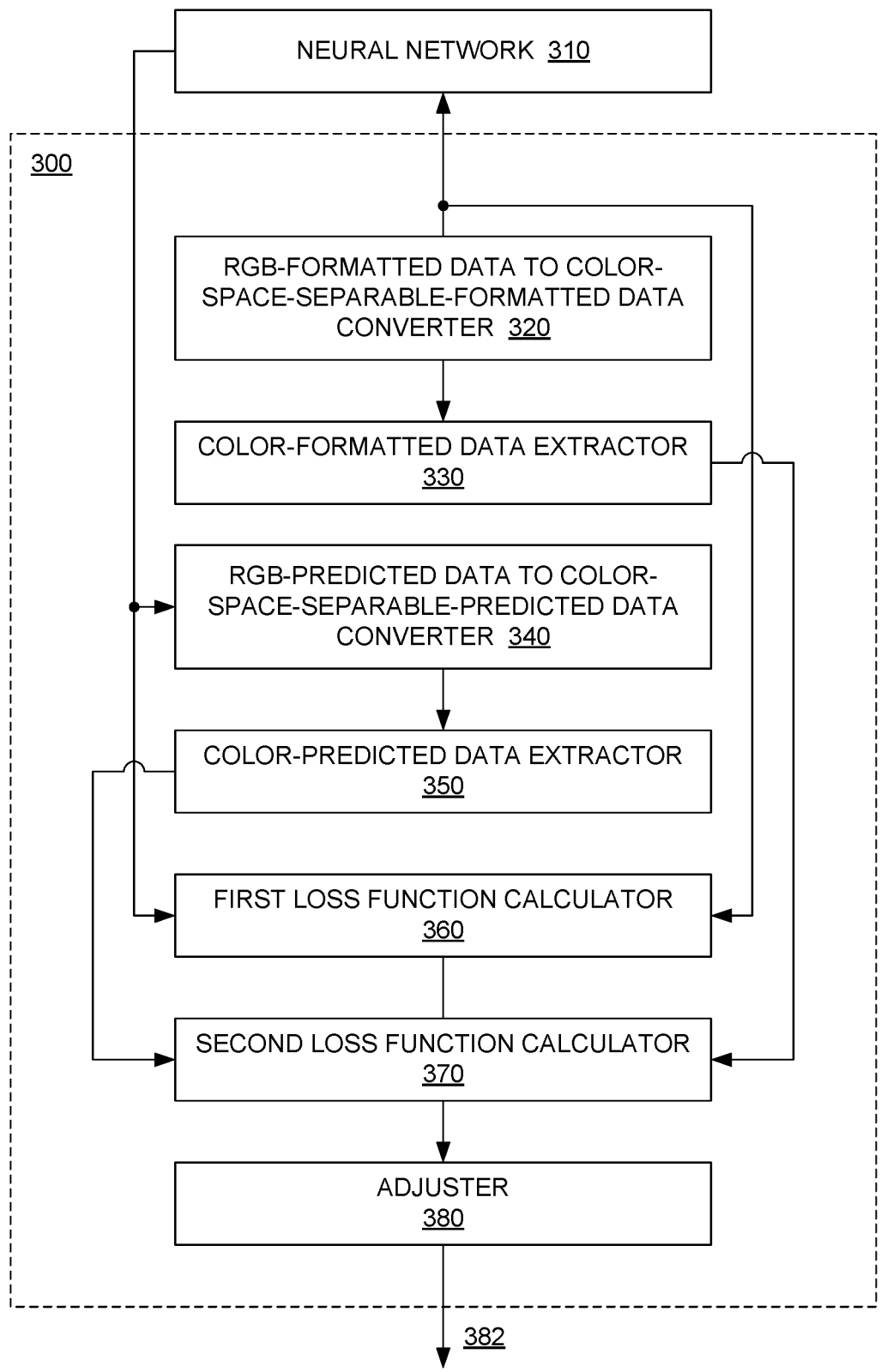
FIG. 3 is a block diagram of an enhanced color reproduction system in accordance with another implementation of the present disclosure.

FIG. 3 is a block diagram of an enhanced color reproduction system 300 in accordance with another implementation of the present disclosure. In the illustrated implementation of FIG. 3, the enhanced color reproduction system 300 includes an RGB-formatted data to color-space-separable-formatted data converter 320, a color-formatted data extractor 330, an RGB-predicted data to color-space-separable-predicted data converter 340, a color-predicted data extractor 350, a first loss function calculator 360, a second loss function calculator 370, and a weight adjuster 380.

In one implementation, the RGB-formatted data to color-space-separable-formatted data converter 320 is configured to convert the RGB-formatted data to color-space-separable-formatted data. In one implementation, the color-space-separable-formatted data includes YCbCr-formatted data. In another implementation, the color-space-separable-formatted data includes Lab-formatted data. The RGB-formatted data to color-space-separable-formatted data converter 320 is also configured to send the RGB-formatted data to a neural network 310 for training to generate RGB-predicted data. In one implementation, the RGB-predicted data to color-space-separable-predicted data converter 340 is configured to convert the RGB-predicted data generated by the neural network 310 to color-space-separable-predicted data.

In the illustrated implementation of FIG. 3, the color-formatted data extractor 330 is configured to extract color-formatted data from the color-space-separable-formatted data, while the color-predicted data extractor 350 is configured to extract color-predicted data from the color-space-separable-predicted data. In one implementation, the color-space-separable-formatted data includes the YCbCr-formatted data and the color-formatted data is formed by using the color channels (i.e., CbCr channels) of the YCbCr-formatted data. In one implementation, the color-space-separable-predicted data includes the YCbCr-predicted data and the color-predicted data is formed by using the color channels (i.e., CbCr channels) of the YCbCr-predicted data.

In the illustrated implementation of FIG. 3, the first loss function calculator 360 is configured to compute a first loss function by calculating the difference between the RGB-formatted data and the RGB-predicted data. The second loss function calculator 370 is configured to compute a second loss function by calculating the difference between the color-formatted data and the color-predicted data.

In the illustrated implementation of FIG. 3, the weight adjuster 380 is configured to adjust or control the color reproduction output 382 by adjusting the balance between the first loss function and the second loss function. In one implementation, the balance is achieved when an observer subjectively determines that the balance has been reached. In another implementation, the balance is determined by some objective criteria that the balance between the overall image quality and the color reproduction has been reached.

Figure 4A:
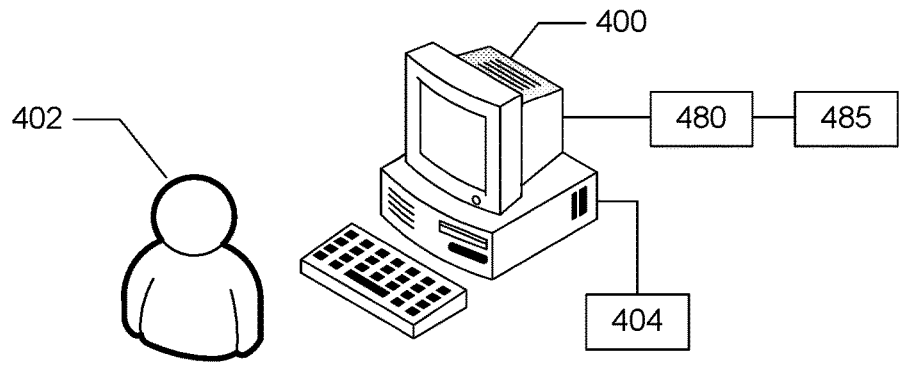
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement an application for enhancing color reproduction in an upscaling process.

Figure 4B:
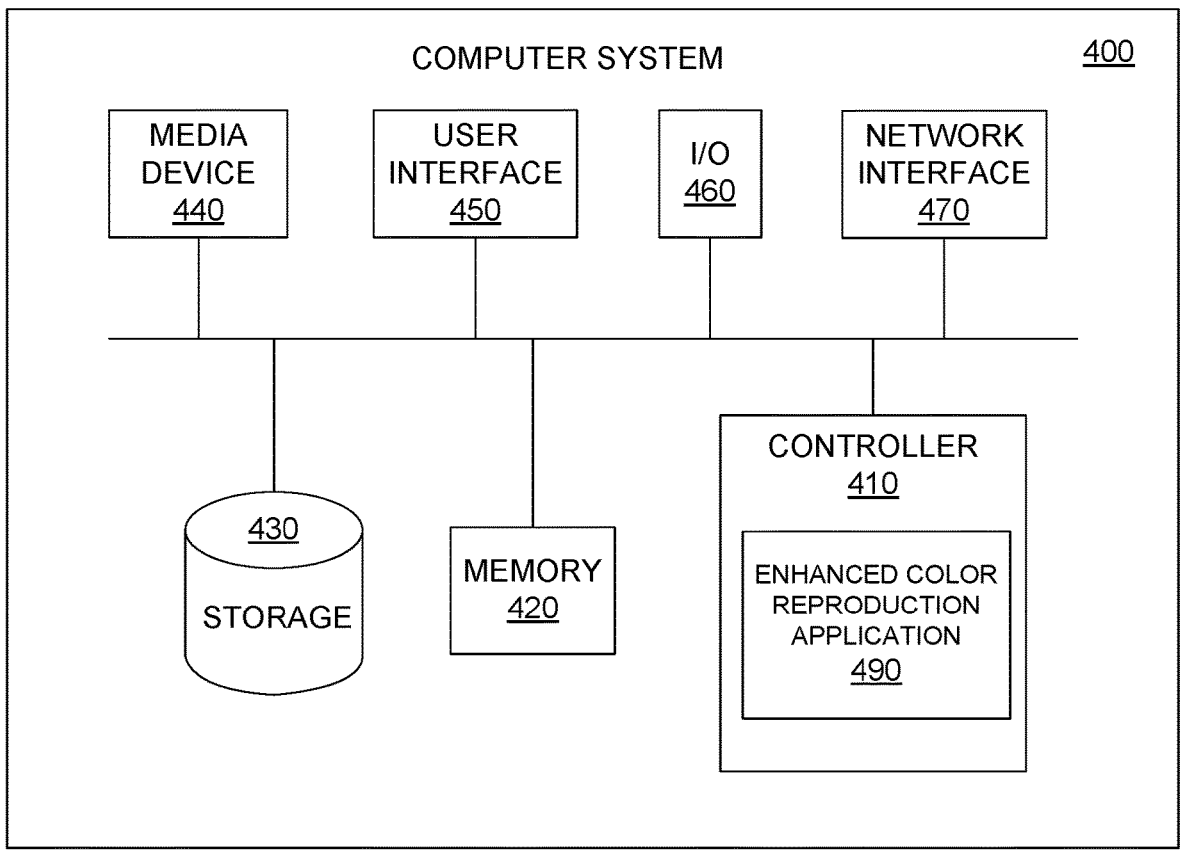
FIG. 4B is a functional block diagram illustrating the computer system hosting the enhanced color reproduction application in accordance with an implementation of the present disclosure.

The computer system 400 stores and executes the enhanced color reproduction application 490 of FIG. 4B. In addition, the computer system 400 may be in communication with a software program 404. Software program 404 may include the software code for the enhanced color reproduction application. Software program 404 may be loaded on an external medium such as a CD, DVD, or a storage drive, as will be explained further below.

Furthermore, computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the enhanced color reproduction application. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the enhanced color reproduction application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the enhanced color reproduction application 490 with a software system, such as to enable the creation and configuration of engines and data extractors within the enhanced color reproduction application. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of computer system 400. For example, storage 430 stores data used by the enhanced color reproduction 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium (i.e., non-transitory medium) and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for enhancing color reproduction in an upscaling process, the method comprising:

converting RGB-formatted data to color-space-separable-formatted data;

sending the RGB-formatted data to a neural network for training to generate RGB-predicted data;

converting the RGB-predicted data to color-space-separable-predicted data;

computing a first loss function by calculating a first difference between the RGB-formatted data and the RGB-predicted data;

extracting color-formatted data from the color-space-separable-formatted data;

extracting color-predicted data from the color-space-separable-predicted data;

computing a second loss function by calculating a second difference between the color-formatted data and the color-predicted data; and adjusting a balance between the first and second loss functions.

2. The method of claim 1, wherein the RGB-formatted data is an RGB-formatted image and the color-space-separable-formatted data is a color-space-separable-formatted image.

3. The method of claim 1, wherein the color-space-separable-formatted data includes YCbCr-formatted data.

4. The method of claim 3, wherein extracting color-predicted data from the color-space-separable-predicted data comprises extracting color channels of the YCbCr-formatted data.

5. The method of claim 4, wherein the color channels include CbCr channels of the YCbCr-formatted data.

6. The method of claim 1, wherein the color-space-separable-formatted data includes Lab-formatted data.

7. The method of claim 1, wherein adjusting the balance between the first and second loss functions comprises adjusting the weights for the first and second loss functions until the balance is found.

8. An enhanced color reproduction system, comprising:

an RGB-to-color-space-separable converter configured to convert RGB-formatted data to color-space-separable-formatted data and to convert RGB-predicted data to color-space-separable-predicted data;

a color extractor configured to extract color-formatted data from the color-space-separable-formatted data and to extract color-predicted data from the color-space-separable-predicted data;

a loss function calculator configured to compute a first loss function by calculating a first difference between the RGB-formatted data and the RGB-predicted data and to compute a second loss function by calculating a second difference between the color-formatted data and the color-predicted data; and an adjustor configured to control an amount of the first loss function and an amount of the second loss function applied to a system output.

9. The system of claim 8, wherein the color-space-separable-formatted data includes YCbCr-formatted data and the color-space-separable-predicted data includes YCbCr-predicted data.

10. The system of claim 9, wherein the color extractor is configured to extract color channels of the YCbCr-formatted data and the YCbCr-predicted data.

11. The system of claim 10, wherein the color channels include CbCr channels of the YCbCr-formatted data and the YCbCr-predicted data.

12. The system of claim 8, wherein the adjuster comprises:

a first multiplier configured to receive the first loss function and produce a first output; and a second multiplier configured to receive the second loss function and produce a second output.

13. The system of claim 12, wherein the adjuster further comprises a weight adjuster configured to generate a first weight to be applied to the first multiplier and to generate a second weight to be applied to the second multiplier.

14. The system of claim 13, wherein the adjuster further comprises an adder configured to add the first output and the second output to produce the system output, wherein the first output is the result of multiplying the first loss function by the first weight and the second output is the result of multiplying the second loss function by the second weight.

15. The system of claim 14, wherein the adjuster further comprises a feedback unit configured to receive the system output and to provide a feedback to the weight adjuster to find a balance between an overall image quality and a color reproduction.

16. An enhanced color reproduction system receiving RGB-formatted data, comprising:

a first converter configured to convert the RGB-formatted data to color-space-separable-formatted data, the first converter also configured to send the RGB-formatted data to a neural network, which generates RGB-predicted data;

a first extractor configured to extract color-formatted data from the color-space-separable-formatted data;

a second converter configured to convert the RGB-predicted data to color-space-separable-predicted data;

a second extractor configured to extract color-predicted data from the color-space-separable-predicted data;

a first loss function calculator configured to compute a first loss function by calculating a difference between the RGB-formatted data and the RGB-predicted data;

a second loss function calculator configured to compute a second loss function by calculating a difference between the color-formatted data and the color-predicted data; and an adjuster configured to control a system output by adjusting a balance between the first loss function and the second loss function.

17. The system of claim 16, wherein the color-space-separable-formatted data includes YCbCr-formatted data and the color-space-separable-predicted data includes YCbCr-predicted data.

18. The system of claim 17, wherein the color extractor is configured to extract color channels of the YCbCr-formatted data and the YCbCr-predicted data.

19. The system of claim 18, wherein the color channels include CbCr channels of the YCbCr-formatted data and the YCbCr-predicted data.

20. The system of claim 16, wherein the balance is determined by using some objective criteria between an overall image quality and a color reproduction.

* * * * *